United States Patent [19]
Malhi

[11] Patent Number: 5,844,773
[45] Date of Patent: Dec. 1, 1998

[54] PORTABLE COMPUTING DEVICE HAVING LIGHT SOURCE IN BASE

[75] Inventor: Satwinder Malhi, Garland, Tex.

[73] Assignee: Texas Instruments Incorporated, Dallas, Tex.

[21] Appl. No.: 599,210

[22] Filed: Dec. 1, 1995

[51] Int. Cl.⁶ .............................. G06F 1/16; G01D 11/28
[52] U.S. Cl. ........................... 361/681; 345/905; 362/26
[58] Field of Search .................................. 361/680–683, 361/686; 364/708.1; 345/50, 87, 905; 362/31, 26; 349/58, 65; G06F 1/16

[56] References Cited

U.S. PATENT DOCUMENTS

| | | | |
|---|---|---|---|
| 5,178,447 | 1/1993 | Murase et al. | 362/26 |
| 5,262,926 | 11/1993 | Hall | 361/681 |
| 5,510,806 | 4/1996 | Busch | 361/681 |
| 5,537,296 | 7/1996 | Kimura et al. | 362/31 |
| 5,548,478 | 8/1996 | Kumar et al. | 361/681 |

*Primary Examiner*—Lynn D. Feild
*Attorney, Agent, or Firm*—Bret J. Petersen; James Kesterson; Richard Donaldson

[57] ABSTRACT

An improved portable notebook computer having a base (15) connected to a display unit (20) that folds along a spine (26). The display unit (20) is pivotally coupled to the base (15) for motion and houses a plurality of display components including a light source (85), light guide (80) and LCD (50). The display drive circuits (115), light source (85), power board (165) and related display components are relocated to the base (15) reducing the thickness and weight of the display unit (20). PWB's (115, 120, 125) used to control LCD (50) display functions are maintained on the display case back (70) to take advantage of available space within the display unit (20). A flexible circuit (330) extends from the base (15) to the display unit (20) to connect the display drive circuits (115) to the PCB's (115, 120, 125) for controlling LCD (50) display functions.

16 Claims, 4 Drawing Sheets

FIG. 4
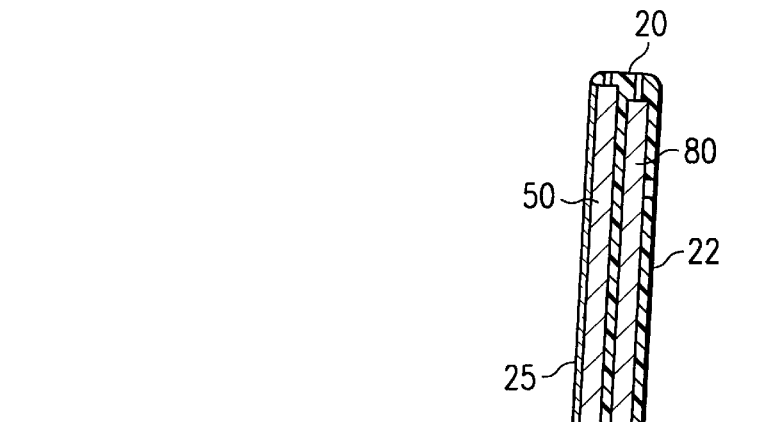
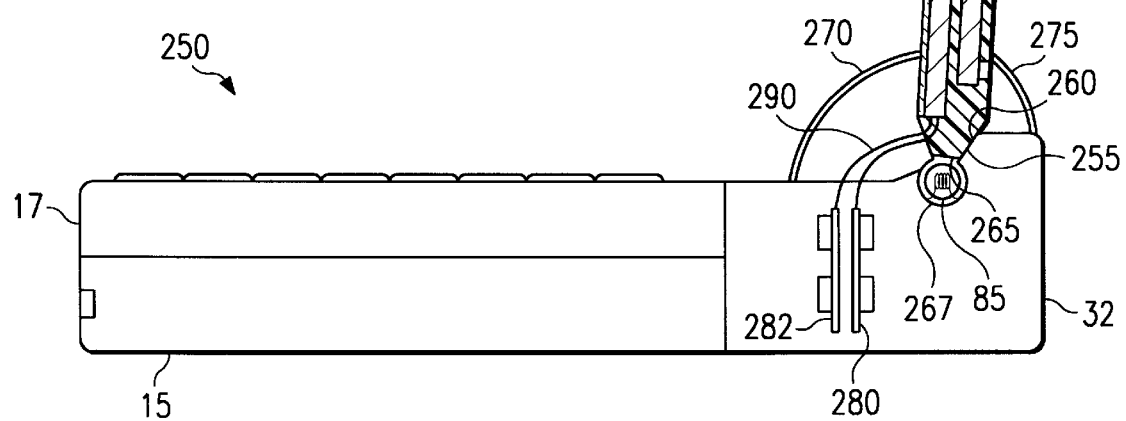

PORTABLE COMPUTING DEVICE HAVING LIGHT SOURCE IN BASE

TECHNICAL FIELD

The present invention relates in general to an improved portable computing device and, in particular, to a portable computer system with a display unit having significantly reduced size and weight characteristics compared to prior art systems.

BACKGROUND OF THE INVENTION

Without limiting the scope of the invention, its background is described in connection with a portable notebook computer system having a base, display unit and a Liquid Crystal Display (LCD) type screen.

The increased demand for portable computing devices, such as laptop and notebook computers, has resulted in a proliferation of technical advances and breakthroughs designed to increase system functionality, performance and convenience. Many of these advances have resulted in systems that are small and lightweight making the computer easy to store and transport. Today's computer user, however, demands systems that are even more compact and more lightweight compared to prior systems.

The obstacles faced by designers in reducing system size and weight relate in large part to the number and types of devices and components options typically found in the more sophisticated fully featured portable computers. For example, users now demand options such as high resolution graphic LCDs, mass storage devices, Random Access Memory (RAM), micro diskette drives, spare battery cells and full-sized keyboards.

While many of these components have seen dramatic size and weight reductions over the years, such options still account for a major portion of the system's overall size and weight. Moreover, as users demand more functional and sophisticated systems, the push to miniturize components becomes greater.

Some methods of reducing system size and weight are available. For example, manufacturers have begun using newer and more efficient designs, Printed Circuit Board (PCB) layouts and/or assemblies that take advantage of available system spacing. The use of Application Specific Integrated Circuitry (ASIC) technology is also prevalent. All such methods have been effective to some extent in reducing the physical dimensions and weight of the portable computer.

A subsystem that contributes greatly to overall system size and weight is the computer's display unit. The display unit typically combines a display case, LCD screen, lamp or other light source and other components necessary to provide screen output capabilities. The typical display unit on today's portable computer is approximately 0.5" thick and weighs 600 grams or more.

If dramatic reductions in weight and height of portable computers is to be achieved, the LCD and display case must be also undergo dramatic weight and size reductions.

SUMMARY OF THE INVENTION

The recent advances in portable computing technology and the move towards lighter and more compact systems has created a need for an improved portable computing device. Standard system designs that were once breakthrough have become outdated as users depend on their portable computer systems for tasks previously reserved for larger desktop systems. Today users want a lightweight portable system that is fully functional and easy to carry.

Accordingly, it is a principle object of the present invention to provide an improved portable computer system with a decreased size and weight as compared to the prior art systems with a primary emphasis on reducing the weight and thickness of the display unit. This is accomplished by relocating the thick and heavy components of the display subsystem to the base of the system. In one embodiment, the relocated components are placed in areas of the base previously unoccupied by other components or devices.

Yet another object of the present invention is to provide a portable computer system with a lightweight thin profile display unit. In this regard, the light source, power supply and display electronics of the system are relocated to the system's base. The thickness and weight of the display unit are reduced thereby reducing the physical dimensions of the overall system.

Disclosed is an improved portable computing device having a base connected to a display unit. The display unit folds along a spine in the base and permits the device to open and close via flexible electromeric extenders coupled to the computer. The display unit is pivotally coupled to the base which houses a plurality of display components including a light source, light guide and LCD.

Also disclosed is an improved portable computing device where the display electronics, light source, power board and related components are maintained within the system base and connected to the display unit via a flexible circuit member. In this way, components that are large and heavy are relocated to areas of the device where space is available.

Also disclosed, is a lightweight design of the display unit where the Printed Wiring Boards (PWB) typically found surrounding the LCD of prior art systems and used to control LCD display functions are relocated to the case back of the display unit. A flexible circuit extends from the base to the display unit and connects signal from the display electronics to the PWBs for controlling LCD display functions.

The improved portable computing device of the present invention has the display's power supply and light source relocated to the base in an area near the spine of the computer. The display unit is mounted to the base in such a way that allows emitted light from the light source to enter a light guide mounted within the display. The light guide distributes the emitted light evenly across the system's LCD.

For a more complete understanding of the present invention, including its features and advantages, reference is now made to the following detailed description, taken in conjunction with the accompanying drawings.

BRIEF DESCRIPTION OF THE DRAWINGS

In the drawings:

FIG. 4 is a side profile view of a portable notebook computer and display in accordance with the preferred embodiment of the invention;

Corresponding numerals and symbols in the different figures refer to corresponding parts unless otherwise indicated.

DETAILED DESCRIPTION OF THE PREFERRED EMBODIMENT

Figure 1:
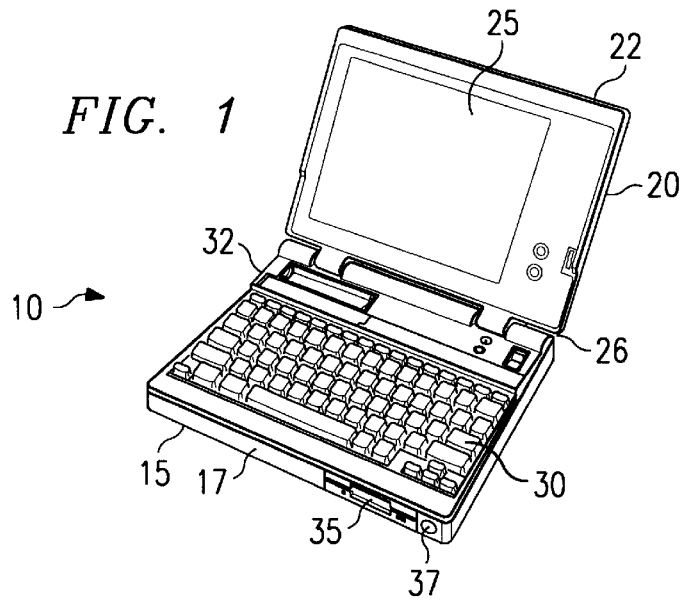
FIG. 1 shows a complete portable notebook computer with display.

In reference to FIG. 1, a portable computing device in the form of a portable notebook computer is shown and denoted generally as 10. The portable notebook computer 10 has a base 15 for housing all of the various computer options, devices and components depending on the system configuration, setup and functionality.

For example, portable notebook computer 10 has a diskette drive 35 accessible from the base front 17 of base 15. Also, button 37 protrudes from the base front 17 allowing the user to operate the insertion and/or removal of disks from diskette drive 35. Other options such as internal modems, hard disk drives, memory boards, PCMCIA cards and others may also be contained within base 15. A keyboard 30 is also provided as an input means.

As shown, base 15 is attached to a display unit 20 which comprises the display components and devices needed to permit visual representation of data and information to the user via screen 25. The base 15 forms a substantially rectangular enclosure for housing a plurality of computing components. The display unit 20 forms a substantially rectangular enclosure for housing a plurality of display components. Display unit 20 comprises a case 22 which in the preferred embodiment is made of a tough acrylic or polyurethane material capable of withstanding cracking or fading. Case 22 is used to house all of the display unit 20 components which are necessary to provide screen 25 output capabilities.

Screen 25 of the portable notebook computer 10 is fixed to the front of the case 22 and forms a substantially flat viewing surface providing a wide-open view of the data and information presented to the user. In the preferred embodiment screen 25 conforms to existing industry standards and is made of a clear see through material comprising a flat surface area approximately 6" by 8" inches (~9.5" diagonal). It should be understood that screen 25 may be of other sizes and dimensions. The properties of screen 25 permit light generated from within display unit 20 to be perceived by the user.

The spine 26 of the portable notebook computer 10 is maintained near the rear 32 of base 15. In one embodiment, the spine 26 comprises a tubular shaped structure that extends the entire length of the portable notebook computer 10 along display unit 20 and forms a rotatable support to which base 15 and display unit 20 are attached. In this way, display unit 20 can be rotated about base 15 along an axis perpendicular to spine 20 for closing and opening the portable computer notebook 10. While in use, for example, the display unit 20 is rotated away from base 15 along spine 26 to expose screen 25.

Figure 2:
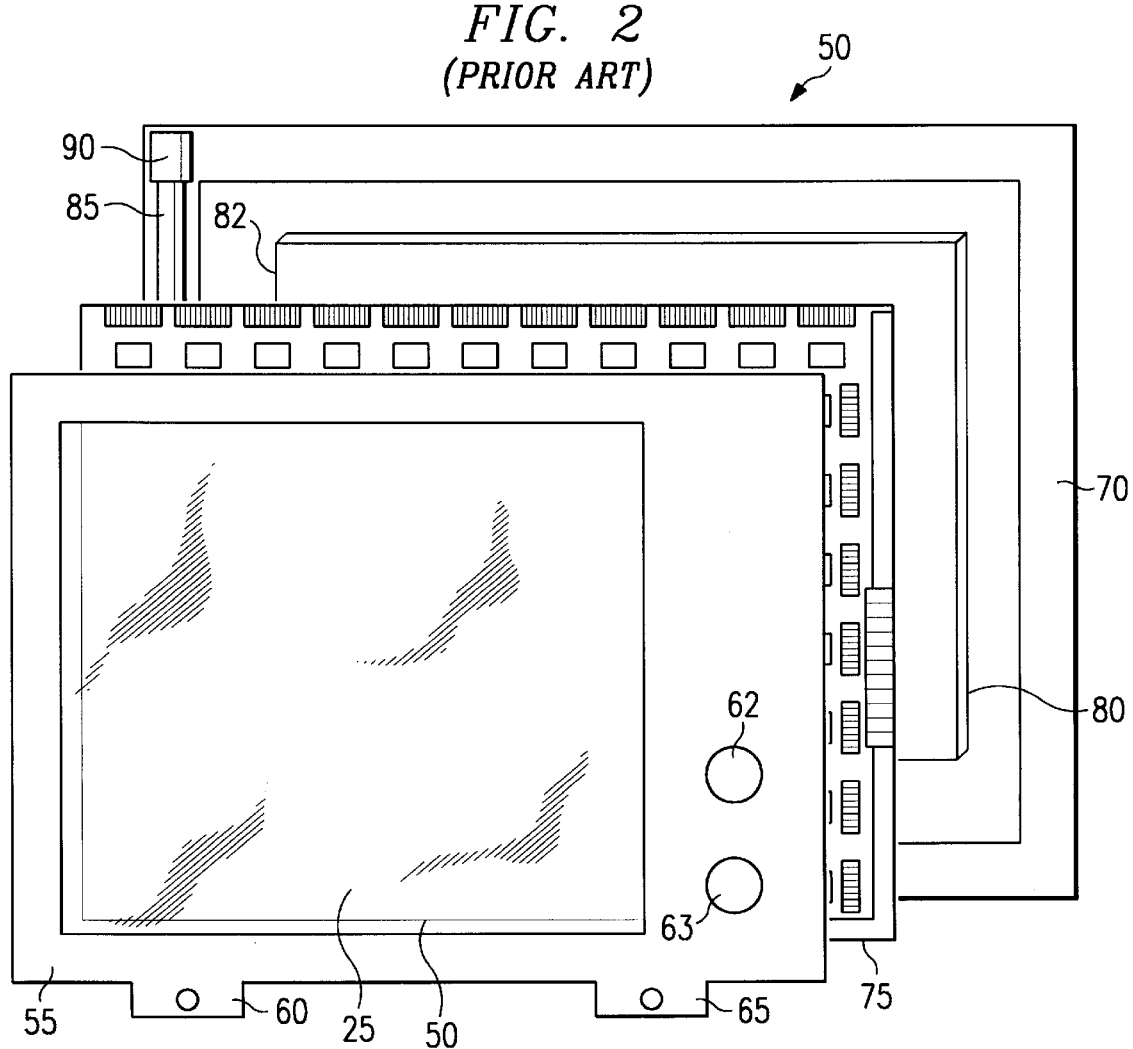
FIG. 2 shows the display unit assembly for a portable notebook computer.

Turning now to FIG. 2, a detailed view of the display unit 20 assembly is shown and denoted generally as 50. The display case front 55 holds screen 25 in place. In the preferred embodiment, case front 55 is made of a resilient polyurethane material.

Fastener 60 and fastener 65 secure the case front 55 to the case back 70 to form a self-enclosed housing for all of the various components found in display unit 20. Fastener 60 and fastener 65 also brace the display unit 20 to the portable notebook computer 10 about spine 26 for coupling the base 15 to the display unit 20.

Behind the case front 55 is the display board 75 which contains the various display electronics including any components, circuits, devices, wiring and leads used by the system to perform the system's display functions. Examples of such display electronics include resistors, capacitors, diodes, logic arrays, printed circuits, surface mounts, chips and others.

The display board 75 fits within the area defined by the case front 55 and case back 70. The display electronics are of various heights and sizes, but also fit within the area between the case front 55 and the case back 60. The thickness of the display unit 20, however, is determined primarily by the size of the display electronics.

In the preferred embodiment, the display board 75 is integrated with the LCD 50 to form a single display layer that fits within the area between the case front 55 and the case back 70. In this arrangement, it is the display electronics on the display board 75 that determines the thickness of the display board 75 layer and correspondingly the display until 20. Decreasing the size and number of components on the display board 75 decreases the overall weight and thickness of the display unit 20.

Also shown in FIG. 2 is a light guide 80 positioned between the display board 75 and the case back 70. Light guide 80 works in conjunction with light source 85 to disperse light evenly along the surface of the LCD 50. The area between the LCD 50 and the case back 70 holds light guide 45.

In one embodiment, light guide 80 is made of an acrylic polyurethane material approximately 0.2" inches thick and has a flat surface area that is coated with a white sheet of light reflective material. The purpose of light guide 80 is to permit light that enters along any edge of light guide 80 and disperse it evenly along its surface. In this way, light captured by light guide 80 is dispersed in a substantially even manner along the entire LCD 50 surface area.

In one embodiment, light source 85 is a tube shaped low intensity lamp approximately 7.5 inches long and 0.2 inches in diameter. As shown, light source 85 has a cap 90 which supports the light source 85 in place on the case back 70.

In operation, light emitted from light source 85 enters the light guide 80 along a side edge such as edge 82. The reflective material of the light guide 80 captures the emitted light and distributes it evenly across its surface. Being parallel to the light guide 80, LCD 50 receives the light from the light source 85 causing the screen 25 to illuminate. The display board controls the display intensity of the light on LCD 50 across individual pixels (not shown) of the LCS depending on the data and/or information to be shown.

Thus, the light guide 80, light source 85, LCD 50 and display board 75 are used in this way to display data and information to the user via screen 25. The user can vary the intensity of light source 85 via control 62 and/or control 63. For example, the brightness and contrast of screen 25 can be varied with control 62 and/or control 63.

Figure 3:
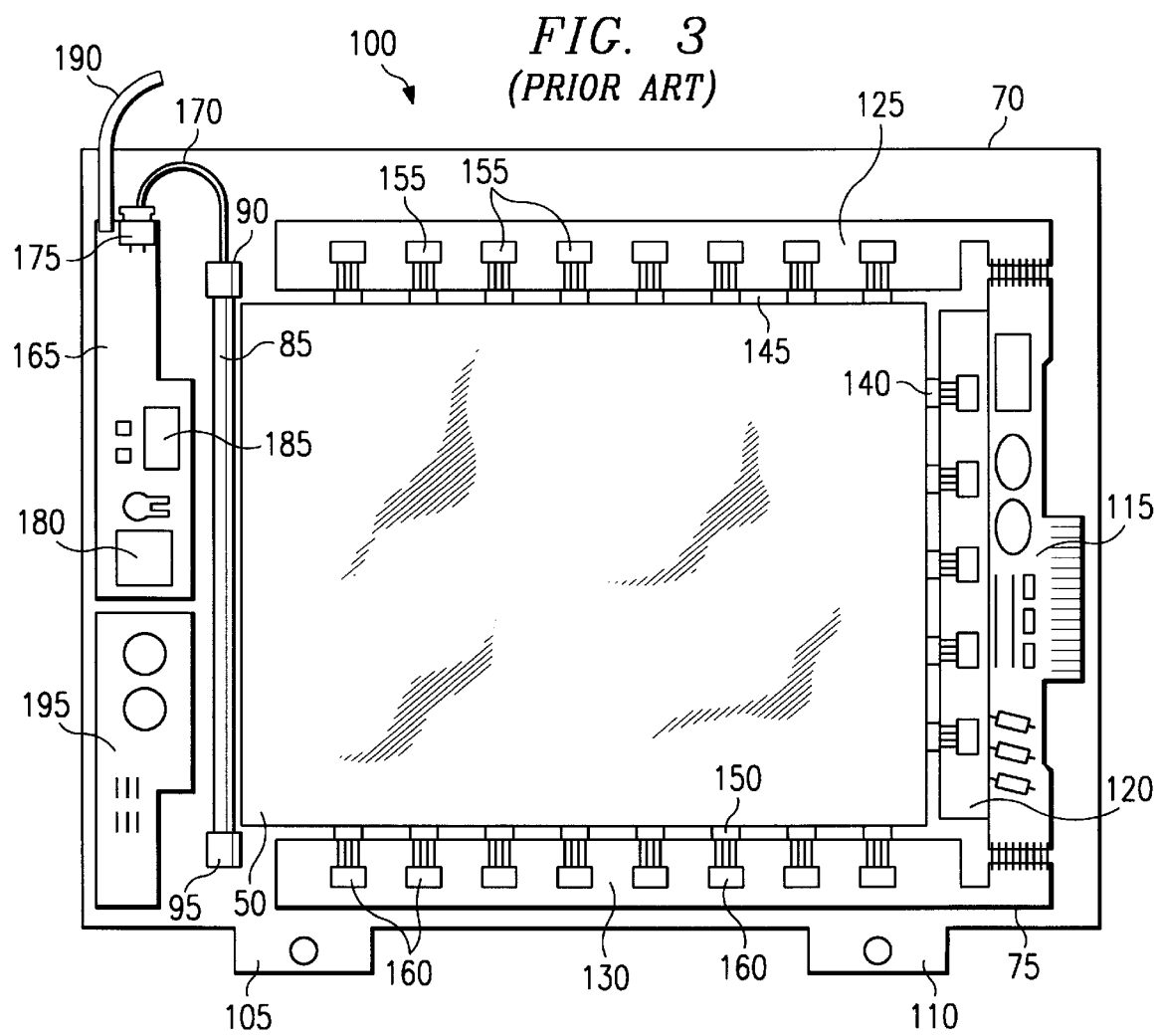
FIG. 3 shows the screen assembly found in the display unit of a portable notebook computer.

Turning now to FIG. 3, a detailed view of the screen assembly is shown and denoted generally as 100. Fastener 105 and fastener 110 are coupled to the base back 70 and joined with fastener 60 and fastener 65, respectively, to secure the case front 55 to the case back 70. When secured in this fashion, case front 55 and case back form a self-enclosed housing for all the various components within the display unit 20.

The display board 75 contains the display circuits 115, Printed Wiring Board (PWB) 120, PWB 125, and PWB 130. PWB 120, PWB 125 and PWB 130 contain a plurality of display chips used to control the display characteristics of individual pixel locations on the LCD 50. Interface 140, interface 145 and interface 150 are used to connect the PWB 120, PWB 125 and PWB 130 to the LCD 50.

The components on display board 75 typically include resistors, capacitors, diodes, logic arrays, printed circuits, chips, circuit mounts and others which add to the width and weight of the overall display unit 20.

In reference to PWB 125, FIG. 3 shows that integrated chips 155 are provided to perform the various logic functions necessary to drive designated pixel groups of LCD 50. PWB 125 has an interface 145 to the LCD 50. The length of PWB 125 is approximately that of LCD 50. The width of PWB 125 limits the size of LCD 50 since the entire assembly 80 must fit within the enclosed area of display unit 20. It should be understood that other sizes and dimensions may be employed.

Likewise, PWB 130 has an interface 150 to the LCD 50 for driving portions of the display screen. Integrated chips 160 are located on PWB 130 for driving designated pixel portions of the LCD 50. As shown, PWB 130 limits the vertical length of LCD 50 to provide room for the various display components within display unit 20.

A power board 165 provides energy to the light source 85 via lead 170. In practice, the power board 165 may take the form of a miniaturized power supply coupled to the system's main power supply in the base 15. Power board 165 provides the electrical energy for the LCD 50 of the display unit 20. As shown, lead 170 joins the light source 85 to the power board 165. Cap 90 and cap 95 support the light source 85 to the case back 70.

The power board 165 has various components and devices necessary to deliver an adequate amount of power to light source 85. A transformer 180 and coil 185 are shown as examples but other components may also be used. Also, a connector 175 is used to couple the power board 165 to the light source 85 via lead 170. A second lead 190 extends to the main system power source, such as a regulated power supply (not shown), in the base 15 of portable notebook computer.

The size and weight of the power board 165 including components such as transformer 180, coil 185, connector 175, lead 170 and lead 190 effect the size and weight of the overall display unit 20. Reducing the size and weight of the power board 165 and its components would therefore reduce the overall display unit 20 size and weight.

A display control board 195 is also provided for varying the display characteristics of the LCD 50. As shown, display circuits 115, PWB 120, PWB 125, PWB 130, power board 165 and display control board 195 all surround LCD 50 and require considerable amounts of space within the display unit 20. The size of LCD 50 is limited by power board 165, PWB 120, PWB 125, PWB 130 and display control board 195. Also, the weight and thickness of display unit 20 is increased with display circuits 115, PWB 120, PWB 125, PWB 130, power board 165 and display control board 195.

Turning now to FIG. 4, a side profile view of the portable notebook computer 10 in accordance with the preferred embodiment of the invention is shown and denoted generally as 250. In one embodiment, base 15 measures approximately 8.5" to 10" inches from the base front 17 to the base rear 32. Other width sizes are also available.

Profile 250 shows a the display unit 20 comprising a display case 22 coupled to the base 15 via fitting 255 which fits into base opening 260. As shown, opening 260 is funnel shaped to accommodate fitting 255 which likewise has a funnel shaped end. In one embodiment, fitting 255 forms an end of the display case 22 and has an opening 265 which protrudes into the base opening 260.

Opening 265 extends into the display case 22 interior. The light source 85 has been relocated within base opening 260 in a substantially rounded lower cavity 267 which surrounds the light source 85. Thus, in the configuration shown light from the light source 85 shines into the opening 265 of the display case 22 and reached the light guide 80.

In the preferred embodiment, light from the light source 85 is transmitted through opening 265 into the interior of the display case 22. As the light travels into display case 22 it is captured by the light guide 80 an distributed evenly on the light guide 80 surface. As before, the light is transferred unit LCD 50 for viewing by the user on screen 25.

As shown, display case 22 extends substantially perpendicular to base 15. In other embodiments, display case 22 may be positioned differently with respect to base 15 depending on user preferences as long as light from the light source 85 can be adequately conveyed to the light guide 80.

Profile 250 shows that display case 22 contains LCD 50 and light guide 80. The entire assembly is coupled to the base 15 with extender 270 and extender 275. In the preferred embodiment, extender 270 and extender 275 are made of a flexible and elastic electromeric material that is sturdy but permits the display unit 22 to be separated from the base 15 by the user. It should be understood, however, that other materials may be used to couple the display case 22 to the base 15.

Also, FIG. 4 shows that display electronics in the form of display board 280 and display board 285 have been incorporated in the base 15 and coupled to the LCD 50 via flexible connector 290. In the preferred embodiment, display board 280 and display board 285 provide the same display functionality as display electronics 115 and power board 165. Thus, display electronics 115 and power board 165 are no longer taking up space within the display case 22.

In other embodiments, display board 280 and display board 285 also provide the pixel driver functions of PWB 120, PWB 125 and PWB 130. Thus, PWB 120, PWB 125 and PWB 130 are no longer taking up space within the display case 22.

Figure 5:
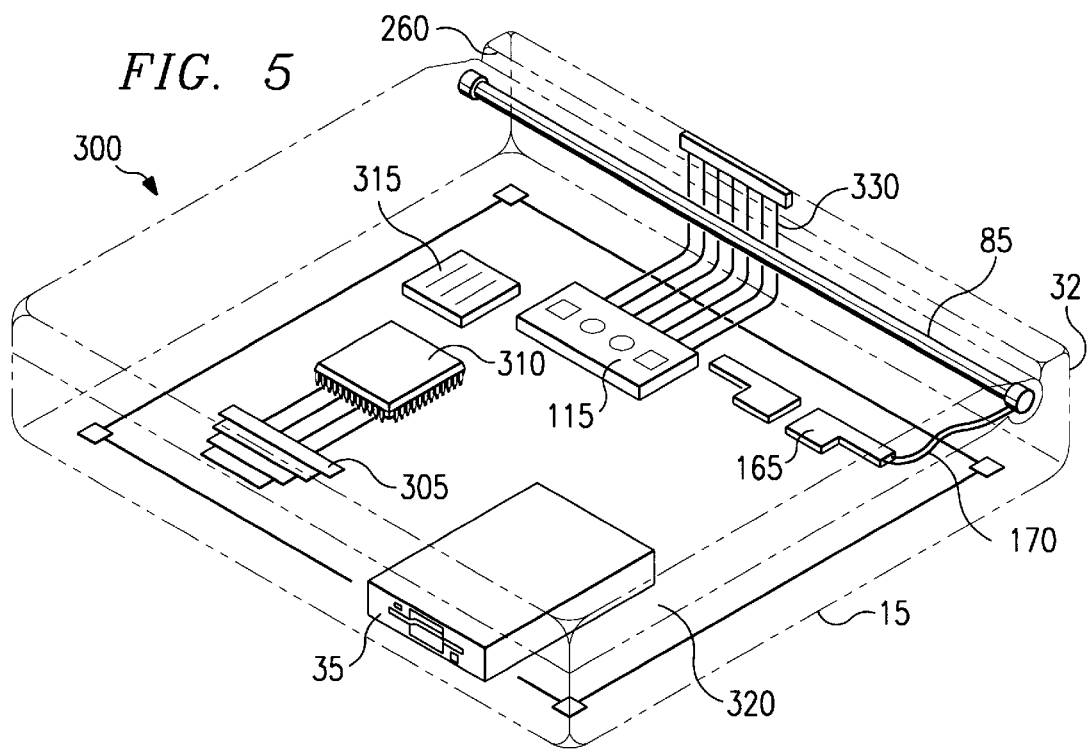
FIG. 5 shows the portable computer base configuration in accordance with the preferred embodiment of the invention.

Turning now to FIG. 5, a perspective interior view of the base assembly in accordance with the preferred embodiment of the invention is shown and denoted generally as 300. Base 15 houses all of the various components and devices within the computer 10 including micro diskette drive 35, memory 305, processor 310 and main power supply 315 among others. The computer's motherboard 320 is a substantially flat PCB surface in the base 15 to which the processor 310, memory 305 and main power supply 315 are fixed.

As illustrated by FIG. 5 the light source 85 has been relocated to base 15 near the rear 32. The area directly surrounding the light source 85 forms an opening 260 through which light from light source 85 can escape. Opening 260 is arranged to accommodate a display unit 20 so that light from the light source 85 will enter the light guide 80 when display unit 20 is in position.

Display unit 20 has an opening 265 for accepting the emitted light. Light source 85 is positioned in the base 15 and joins with the light guide 80 in the display unit 20 near that opening 260. The light source 85 is positioned to emit light in the direction of the display unit 20.

As shown, in this embodiment the display circuits 115 have been relocated to the base 15. In the preferred embodiment, the display circuits 115 are coupled directly to the computer motherboard 320 along with other system components.

A flexible connector 330 is used to connect the display circuits 115 to the display unit 20 permitting control of the LCD 50. Flexible connector 330 can be a flexible ribbon cable or other similar connector means to permit the transfer of signals from the display circuits 115 to the display unit 20.

Also shown is the power board 165 relocated to the computer's motherboard 320. In this arrangement, there is less weight in the display unit 20 since the larger components have been relocated to the system's base 15. In another embodiment, power board 165 can be replaced with a direct connection to computer's main power supply 315. As shown, lead 170 now extends from the power board 165 to the light source 85 all within the base 15.

By relocating the display circuits 115, the light source 85 and power board 165 to the base 15 of the portable notebook computer 10, the size and weight of the display unit 20 is substantially reduced. It should be understood that other arrangements and configurations are feasible and within the scope of the present invention.

Specifically, it should be understood that the display circuits 115 can be located in the display unit 20. Also, it should be understood that the display circuits 115, the light source 85 and power board 165 can be located anywhere within the base 15 without departing from the spirit of the invention as claimed.

Figure 6:
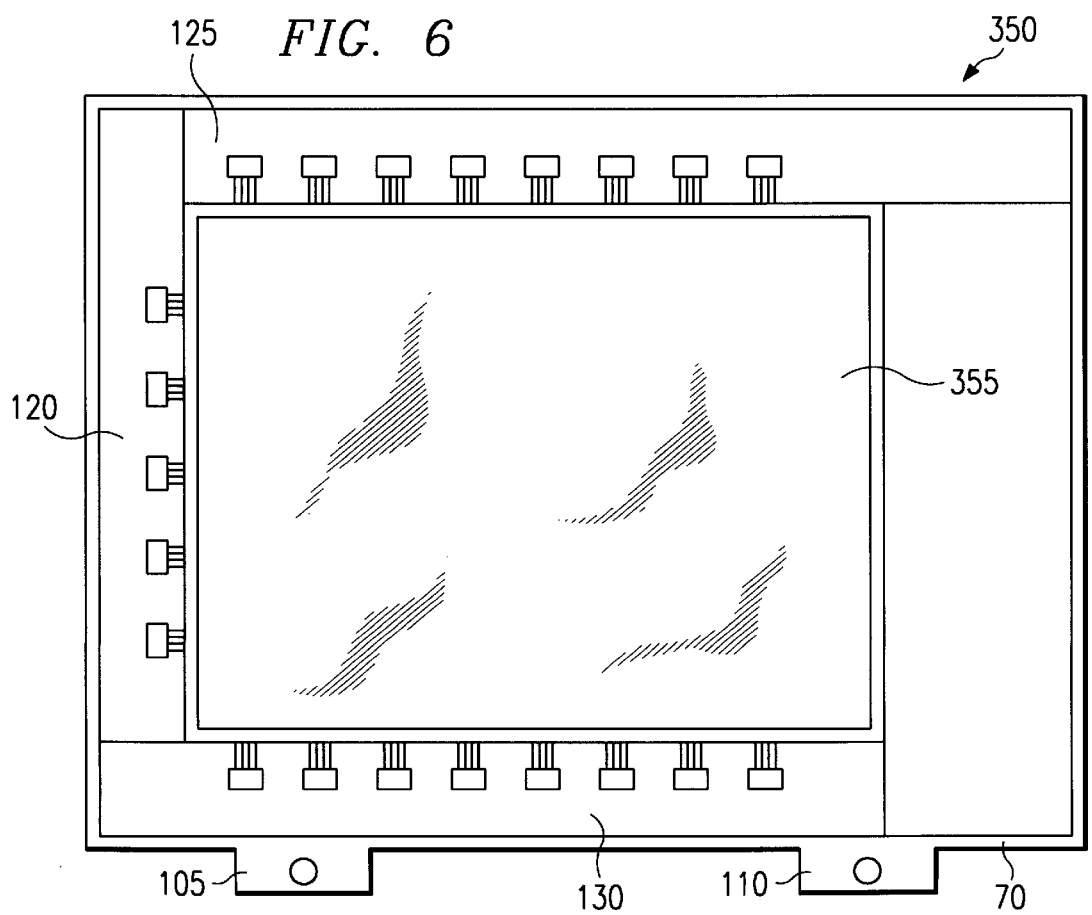
FIG. 6 shows the display back cover assembly in accordance with the preferred embodiment of the invention.

In reference to FIG. 6, the back cover assembly in accordance with the preferred embodiment of the present invention is shown and denoted generally as 350. The case back 70 is secured to the case front 55 via fastener 105 and fastener 110. Also, PWB 115, PWB 120 and PWB 125 have been relocated to the case back 70.

In the preferred embodiment, PWB 115, PWB 120 and 125 are coupled to case back 70 in the area behind the light guide 80. A rectangular-shaped insulator 355 is placed in the open area defined by PWB 115, PWB 120, and PWB 125 reducing the overall costs due to the decreased PCB real estate. Insulator 355 may be made of plastic or a similar material. Thus, PWB 115, PWB 120 and PWB 125 are joined to the case back 70 reducing the overall size of the display unit 20.

The phrase "circuitry" comprehends ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic material families, as well as in optical-based or other technology-based forms and embodiments. It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A computing device comprising:
   a base forming a substantially rectangular enclosure for housing a plurality of computing components;
   a spine coupled to the rear of said base;
   a display unit pivotally coupled to said base about said spine, said display unit forming a substantially rectangular enclosure for housing a plurality of display components; and
   a light source coupled to said base near said spine, said light source positioned to emit light in the direction of said display unit through said spine.

2. The device in accordance with claim 1 further including a light guide contained within said display unit, said light guide coupled to said light source for distributing emitted light.

3. The device in accordance with claim 2 further including a power board coupled to said base; and
   a lead extending from a power supply to said light source.

4. The device in accordance with claim 1 further including:
   a plurality of display electronics coupled to said base;
   a plurality of printed wiring boards contained within said display unit; and
   a circuit joining said plurality of display electronics to said plurality of printed wiring boards.

5. The device in accordance with claim 4 wherein said printed wiring boards are coupled to a case back of said display unit.

6. The device in accordance with claim 1 further including a screen coupled to a case front of said display unit, said screen forming a substantially flat viewing surface.

7. The device in accordance with claim 6 further including a liquid crystal display coupled to said display unit, said liquid crystal display forming a substantially flat surface behind said screen.

8. The device in accordance with claim 7 wherein said computing device is a portable notebook computer.

9. A portable notebook computer comprising:
   a base;
   a backlit LCD display coupled to said base at an opening, said display forming a substantially rectangular enclosure for housing a plurality of display components;
   a light source coupled inside said base near said opening;
   a light guide coupled inside said display, said light guide positioned to receive light from said light source along an edge through said opening.

10. The device in accordance with claim 9 wherein said base is coupled to said display with flexible extenders.

11. The device in accordance with claim 9 further including
    a power board coupled within said base; and
    a lead extending from a power supply to said light source, said lead forming a circuit for delivering current energy to said light source.

12. The device in accordance with claim 10 further including:
    a plurality of display electronics coupled to said base; and
    a plurality of integrated circuits coupled within said display unit, said plurality of integrated circuits electronically linked to said plurality of display electronics.

13. The device in accordance with claim 12 further including a flexible circuit extending from said plurality of display electronics to said plurality of integrated circuits.

14. The device in accordance with claim 12 wherein said plurality of integrated circuits are coupled to a case back of said display unit.

15. The device in accordance with claim 9 wherein said plurality of display components includes at least one screen, one liquid crystal display and one light guide.

16. The device in accordance with claim 9 wherein said display unit is pivotally coupled to said base.

* * * * *